(12) United States Patent
Akin et al.

(10) Patent No.: US 11,740,194 B2
(45) Date of Patent: Aug. 29, 2023

(54) MEASURING MECHANISM FOR MEASURING THERMAL CONDUCTIVITY

(71) Applicant: TUSAS-TURK HAVACILIK VE UZAY SANAYII ANONIM SIRKETI, Ankara (TR)

(72) Inventors: Deger Akin, Ankara (TR); Dilek Kumlutas, Izmir (TR); Furkan Kulak, Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 211 days.

(21) Appl. No.: 17/415,435

(22) PCT Filed: Dec. 19, 2019

(86) PCT No.: PCT/TR2019/051120
§ 371 (c)(1),
(2) Date: Jun. 17, 2021

(87) PCT Pub. No.: WO2020/139262
PCT Pub. Date: Jul. 2, 2020

(65) Prior Publication Data
US 2022/0057348 A1 Feb. 24, 2022

(30) Foreign Application Priority Data
Dec. 28, 2018 (TR) ................. 2018/21017

(51) Int. Cl.
*G01N 25/20* (2006.01)
(52) U.S. Cl.
CPC .................. *G01N 25/20* (2013.01)

(58) Field of Classification Search
USPC ........................................................ 374/44
See application file for complete search history.

(56) References Cited

U.S. PATENT DOCUMENTS

| 5,940,784 A | 8/1999 | El-Husayni |
| 7,540,656 B1 | 6/2009 | Stochl et al. |

(Continued)

FOREIGN PATENT DOCUMENTS

| CN | 102645449 A | 8/2012 |
| CN | 102798645 A | 11/2012 |

(Continued)

OTHER PUBLICATIONS

T. Mcwaid et al: "Thermal contact resistance across pressed metal contacts in a vacuum environment", International Journal of Heat and Mass Transfer, vol. 35, Nov. 1, 1992, pp. 2911-2920.

(Continued)

*Primary Examiner* — Mirellys Jagan
(74) *Attorney, Agent, or Firm* — Notaro, Michalos & Zaccaria P.C.

(57) ABSTRACT

A measurement mechanism having a body, a vacuum chamber that is located on the body and in which a measurement process is performed is disclosed. A first sample and a second sample between which a heat transfer occurs are placed in the vacuum chamber and contact each other. A piston that provides the first sample and the second sample to continuously contact each other, a main heater that is located above the first sample and the second sample, and a cooler located below the first sample and the second sample is also disclosed.

4 Claims, 1 Drawing Sheet

(56) References Cited

U.S. PATENT DOCUMENTS

| | | | |
|---|---|---|---|
| 9,678,025 | B1 | 6/2017 | Fesmire et al. |
| 2014/0050246 | A1 | 2/2014 | Kwon et al. |
| 2022/0050069 | A1* | 2/2022 | Akin ................. G01R 33/3804 |

FOREIGN PATENT DOCUMENTS

| | | | | | |
|---|---|---|---|---|---|
| CN | 106802308 | A | * | 6/2017 | |
| CN | 107782762 | A | * | 3/2018 | ............ G01N 25/20 |
| CN | 108931551 | A | * | 12/2018 | |
| CN | 111157574 | A | * | 5/2020 | |
| CN | 112129810 | A | * | 12/2020 | ............ G01N 25/20 |
| WO | WO-2020139253 | A1 | * | 7/2020 | ............ G01K 17/00 |
| WO | WO-2020139262 | A1 | * | 7/2020 | ............ G01N 25/20 |
| WO | WO-2020139268 | A1 | * | 7/2020 | ............ G01N 25/18 |
| WO | WO-2020139273 | A1 | * | 7/2020 | ............ G01N 25/20 |
| WO | WO-2022005417 | A1 | * | 1/2022 | |

OTHER PUBLICATIONS

Yun Mo et al: "Thermal Contact Resistance Measurements", Journal of Enhanced Heat Transfer, vol. 19, Jan. 31, 2012, pp. 561-569.
International Search Report and Written Opinion for corresponding PCT application No. PCT/TR2019/051120, dated Jun. 13, 2020.
International Preliminary Report on Patentability for corresponding PCT application No. PCT/TR2019/051120, completed Oct. 15, 2020.

* cited by examiner

MEASURING MECHANISM FOR MEASURING THERMAL CONDUCTIVITY

FIELD

The present invention relates to a measurement mechanism which provides measuring thermal contact resistance.

BACKGROUND

Especially, in space and air vehicles, honeycomb sandwich panels having carbon fibre-reinforced plate surfaces are commonly used. While various equipment and components provided in space vehicles may be fixed directly to such panels, the fixing process is performed by means of supports. Equipment, components and/or supports which are fixed to these panels may be made of metallic materials. For this reason, precise determination of thermal contact resistance, which is generated as a result of fixing the equipment, components and/or supports to the panels, is a significant factor for thermal control design of the space vehicle. While measuring the thermal contact resistance, it is provided that at least two samples contact each other. A heat transfer occurs between two samples. Meanwhile, the thermal contact resistance is measured by performing a measurement. Said test is executed in an environment without air interaction. A pressure allows two samples to be in a continuous contact with each other. The continuous pressure is provided by means of a high power piston. In order to be able to measure the thermal contact resistance between two samples, measurement units which measure heat flux are used. There is generated a heat flux in the test medium in order to be able to measure the thermal contact resistance between two samples. The samples are located between a cooler and a heater. However, heat losses may occur through the samples because they are exposed during the test. This affects test results in a negative way.

Chinese patent application no. CN102645449 covered by the known art discloses a measurement mechanism that comprises an insulation wall around the samples.

SUMMARY

An object of the present invention is to provide a measurement mechanism of which the measurement result is improved.

The measurement mechanism aimed to achieve the object of the present invention and disclosed in the claims comprises a body and a vacuum chamber which is located on the body. The vacuum chamber comprises therein a first sample and a second sample between which a heat transfer occurs, and a piston which exerts a continuous pushing force in order for the first sample and the second sample to contact each other. A main heater is located above the first sample and the second sample, and a cooler is located below the first sample and the second sample. A heat flow is provided through the samples from the heater towards the cooler.

The measurement mechanism, which is the subject matter of the invention, comprises a wall located above the cooler. The wall partially encloses the first sample and the second sample. Therefore, heat dissipation through the samples is prevented during the measurement.

In an embodiment of the invention, the measurement mechanism comprises at least one heater located on the wall. Thanks to the heater, a heat shield is formed on the wall. Thus, heat loss through the samples is prevented.

In an embodiment of the invention, the measurement mechanism comprises a heater in the form of a heat tape. Thus, it is made easier to apply heat to the wall. The heat directly contacts the wall. It is provided that the heat is directly transmitted to the wall.

In an embodiment of the invention, the measurement mechanism comprises a wall which provides thermal contact with the cooler. Thus, a heat transfer occurs between the cooler and the wall.

In an embodiment of the invention, the measurement mechanism comprises heat tape located at an end of the wall which is not in contact with the cooler. A heat flow is generated between the cooler and the heat that is emitted from the heat tape. Thus, the measurement is facilitated.

In an embodiment of the invention, the measurement mechanism comprises a wall which is made of a conductive material. Heat transfer can occur on the wall due the fact that the wall is made of a conductive material. Moreover, heat flux is formed on the wall to support the measurement mechanism.

With the present invention, there is developed a measurement mechanism which provides easier measurement.

BRIEF DESCRIPTION OF THE DRAWINGS

The measurement mechanism aimed to achieve the object of the present invention is illustrated in the attached figures, in which.

DETAILED DESCRIPTION

Figure 1:
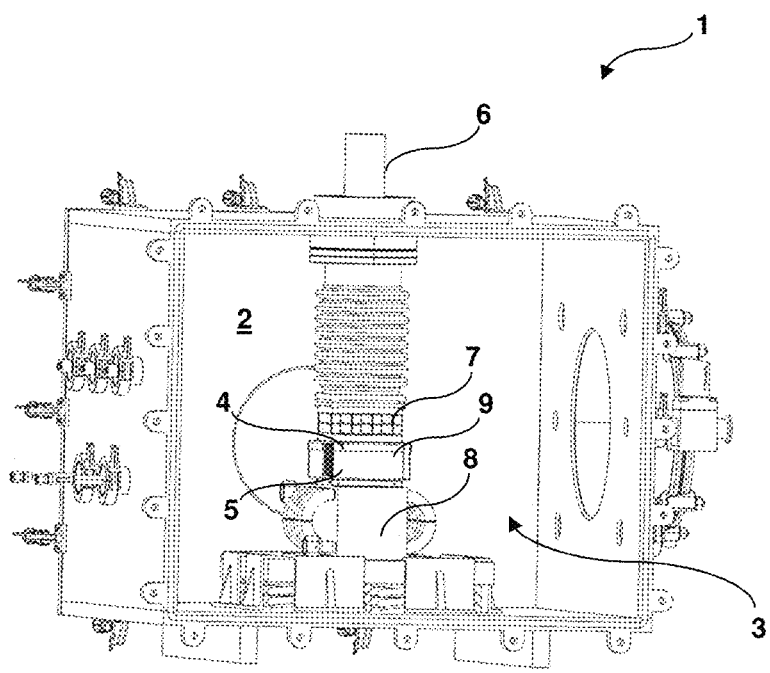
FIG. 1—Perspective view of a measurement mechanism.
Figure 2:
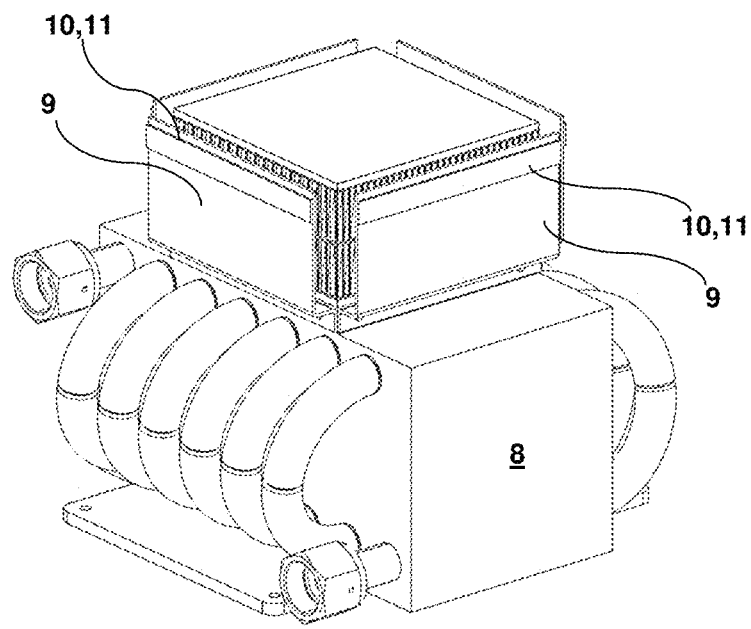
FIG. 2—Perspective view of a cooler, the first sample, the second sample, the wall and the heater.

All the parts illustrated in figures are individually assigned a reference number and the corresponding terms of these numbers are listed below.

1—Measurement mechanism
2—Body
3—Vacuum chamber
4—First sample
5—Second sample
6—Piston
7—Main heater
8—Cooler
9—Wall
10—Heater
11—Heat tape The measurement mechanism (1) comprises a body (2); a vacuum chamber (3) which is located on the body (2) and in which a measurement process is performed; a first sample (4) and a second sample (5) between which a heat transfer occurs, which are placed in the vacuum chamber (3) and contact each other; a piston (6) which provides the first sample (4) and the second sample (5) to continuously contact each other; a main heater (7) which is located above the first sample (4) and the second sample (5); and a cooler (8) which is located below the first sample (4) and the second sample (5). The piston (6) exerts a force to the first sample (4) and the second sample (5) during the measurement. Thus, the first sample (4) and the second sample (5) are in contact with each other during the measurement. A heat flow is generated from the main heater (7) towards the cooler (8) on the vacuum chamber (3). Thus, a heat transfer occurs between the first sample (4) and the second sample (5) due to the heat flow while they contact each other. Thus, thermal contact resistances thereof can be measured.

The measurement mechanism (1), which is the subject matter of the present invention, comprises at least one wall (9) located above the cooler (8) and at least partially surrounding the first sample (4) and the second sample (5). Thanks to the wall (9), there would be no heat loss around the first sample (4) and the second sample (5) during the measurement. Thus, measurement accuracy is improved.

In an embodiment of the invention, the measurement mechanism (1) comprises at least one heater (10) which is located on the wall (9) and provides preventing heat dissipation through the first sample (4) and the second sample (5). It is aimed to create a heat shield on the wall (9) by means of the heater (10). Therefore, heat losses are prevented.

In an embodiment of the invention, the measurement mechanism (1) comprises a heater (10) which is a heat tape (11). The heat tape (11) provides direct contact with the wall (9). Thus, it is provided that the heat is transmitted to the wall (9) without heat loss. The heat tape (11) is electrically operated.

In an embodiment of the invention, the measurement mechanism (1) comprises a wall (9) which is in thermal contact with the cooler (8). Thanks to the cooler (8), temperature at an end of the wall (9) which is in contact with the cooler (8) decreases and the wall (9) cools down.

In an embodiment of the invention, the measurement mechanism (1) comprises a heat tape (11) located at an end of the wall (9) which is not in contact with the cooler (8). Thus, while the wall (9) is heated by the heat tape (11) from one end, it is cooled by the cooler (8) from the other end. Thus, a heat flux is generated on the wall (9) from the heat tape (11) towards the cooler (8). Heat flux provided between the cooler (8) and the main heater (7) located at the measurement mechanism (1) is supported by the wall (9). Thus, the measurement is performed without heat loss through the first sample (4) and the second sample (5).

In an embodiment of the invention, the measurement mechanism (1) comprises a wall (9) which is made of a conductive material. Thus, it is facilitated to create a heat flux between the heat tape (11) and the cooler (8).

With the present invention, there is provided a measurement mechanism (1) which provides preventing thermal losses that may occur through the samples during the measurement. Thanks to a wall (9) surrounding the samples, heat losses to be occur through the samples are prevented.

The invention claimed is:

1. A measurement mechanism (1) comprising:
   a vacuum chamber (3) in which a measurement process is performed;
   a first sample (4) and a second sample (5) between which a heat transfer occurs and which are placed in the vacuum chamber (3) and contact each other;
   a piston (6) coupled to the vacuum chamber (3) which causes the first sample (4) and the second sample (5) to continuously contact each other;
   a main heater (7) which is located above the first sample (4); and
   a cooler (8) which is located below the second sample (5);
   at least one wall (9) located above the cooler (8) and partially surrounding the first sample (4) and the second sample (5); and
   at least one heater (10), which is a heat tape (11) and which is located on the wall (9), and which prevents heat dissipation through the first sample (4) and the second sample (5).

2. The measurement mechanism (1) according to claim 1, wherein the at least one wall (9) is in thermal contact with the cooler (8).

3. The measurement mechanism (1) according to claim 1, wherein an end of the at least one wall (9) is not in contact with the cooler (8) and wherein the heat tape (11) is located at the end of the at least one wall (9) which is not in contact with the cooler (8).

4. The measurement mechanism (1) according to claim 1, wherein the at least one wall (9) is made of a conductive material.

\* \* \* \* \*